(12) United States Patent
Lin et al.

(10) Patent No.: US 6,600,830 B1
(45) Date of Patent: Jul. 29, 2003

(54) METHOD AND SYSTEM OF AUTOMATICALLY EXTRACTING FACIAL FEATURES

(75) Inventors: Chun-Hung Lin, Feng-Sun (TW); Ja-Ling Wu, Taipei (TW)

(73) Assignee: Cyberlink Corporation, Taipei (TW)

( * ) Notice: Subject to any disclaimer, the term of this patent is extended or adjusted under 35 U.S.C. 154(b) by 0 days.

(21) Appl. No.: 09/441,607

(22) Filed: Nov. 16, 1999

(30) Foreign Application Priority Data

Aug. 4, 1999 (TW) ........................................ 88113304 A

(51) Int. Cl.[7] .................................................. G06K 9/00
(52) U.S. Cl. ........................................ 382/118; 382/190
(58) Field of Search .................................. 382/118, 115, 382/227; 340/5.53, 5.83; 356/71; 902/3, 6; 713/186; 707/6, 9

(56) References Cited

U.S. PATENT DOCUMENTS

| | | | | |
|---|---|---|---|---|
| 5,280,530 A | * | 1/1994 | Trew et al. | 348/14.16 |
| 5,412,738 A | * | 5/1995 | Brunelli et al. | 382/115 |
| 5,878,156 A | * | 3/1999 | Okumura | 340/575 |
| 5,978,507 A | * | 11/1999 | Shackleton et al. | 382/195 |
| 6,160,923 A | * | 12/2000 | Lawton et al. | 382/260 |
| 6,252,976 B1 | * | 6/2001 | Schildkraut et al. | 382/117 |
| 6,292,575 B1 | * | 9/2001 | Bortolussi et al. | 382/118 |

OTHER PUBLICATIONS

Lin et al., "Automatic Facial Feature Extraction by Applying Genetic Algoritm", International Conference on Neural Networks, vol.: 3, 1997, pp.: 1363–1367.*
Lin et al., "Automatic Facial Feature Extraction By Genetic Algorithm", Jun. 6, 1999, IEEE Transactions on Image Processing, vol.: 8 Issue: 6, pp.: 834–845.*

* cited by examiner

Primary Examiner—Leo Boudreau
Assistant Examiner—Ryan J. Miller
(74) Attorney, Agent, or Firm—Fish & Richardson P.C.

(57) ABSTRACT

An automatic feature extraction system for analyzing a face image and finding the facial features of the face. In the pre-processing stage, a second-chance region growing method is applied to determine a face region on the face image. In the feature extraction stage, three primary facial features, including both eyes and the mouth, are extracted first. Then other facial features can be extracted according to these extracted primary facial features. Searching feature points can be achieved by calculating the cost function of each point using a simple feature template. In addition, a genetic algorithm can be used to accelerate the process of searching feature points.

17 Claims, 5 Drawing Sheets

METHOD AND SYSTEM OF AUTOMATICALLY EXTRACTING FACIAL FEATURES

BACKGROUND OF THE INVENTION

1. Field of the Invention

The present invention generally relates to a method and system of automatically extracting facial features.

2. Description of the Prior Art

Facial feature extraction plays an important role in many applications, such as very low bit-rate video coding and human face recognition. In the application of the very low bit-rate video coding, the variation of the facial features, so called the local motion, usually carries much more information than other parts of the target image. Therefore, the facial features should be extracted from the target image and processed by special coding schemes. Especially, in the application of the human face recognition, the facial features are extracted as the major analytical objects in analyzing a human face image.

It is still a complex issue to automatically extract the facial features, although it might be easy for people to directly perceive a human face image and pick up the facial features from it. In order to reduce the complexity of facial feature extraction, the input image is restricted to a typical head-and-shoulder image with plain background. In general, the standard facial feature extraction process can be divided into two stages, including a face region estimation stage and a feature point extraction stage.

The face region estimation stage is used to extract a face region from the input image. In a head-and-shoulder image, for example, the face region is located roughly in the center of the image. In addition, the face region usually exhibits higher contrast than its surrounding neighborhoods do. Therefore, the face region can be extracted by using region segmentation or edge detection techniques.

In the feature point extraction stage, the desired facial features, such as eyes, noises and mouth, will be extracted from the face region found in the above stage by template matching. One or several feature templates can be previously defined based on the characteristics of human facial features. Using these feature templates, all candidate points within the face region are evaluated based on a predefined cost function. Those points that have best matching values are regarded as the desired feature points. Although there are many proposed facial feature extraction algorithms nowadays, they still suffer a drawback of computational complexity. The computational cost of the facial feature extraction is dominated by the following three factors, including (1) the estimation of the face region; (2) the complexity of evaluation of the cost function; and (3) the searching for the feature points.

As described above, the estimation of the face region is usually achieved by the region segmentation method or the edge detection method. Although these conventional methods can successfully ferret out the face region, their computational cost is quite high. This is the first drawback of the conventional facial feature extraction methods.

Another critical issue is the design of the feature templates. Since these feature templates are employed to calculate a matching value for each possible feature point within the face region, the complexity of the feature templates dominates the computational cost of the overall feature extraction algorithm. In addition, complex feature templates are not robust when some sub-regions of the face exhibit low contrast. This is the second drawback of the conventional facial feature extraction methods.

In the existing methods, the cost functions are usually applied to all the pixels within the face region to find the best ones. Such methods can properly work in the image with few pixels, but inappropriately in the image with a large number of pixels. This is the third drawback of the conventional facial feature extraction methods.

SUMMARY OF THE INVENTION

Therefore, an object of the present invention is to provide an automatic facial feature extraction method and system for solving various drawbacks in the conventional techniques.

The present invention achieves the above-indicated objects by providing an automatic facial feature extraction system for analyzing a face image. The system comprises a pre-processing unit for generating a face region according to the face image, a front-end feature extraction unit for dividing the face region into a plurality of primary sub-regions pertaining to primary facial features and extracting primary facial feature data from the face image by searching feature points in image portions of the face image corresponding to the primary sub-regions, and a back-end feature extraction unit for determining a plurality of secondary sub-regions pertaining to secondary facial features according to the position information of the primary facial feature data and extracting secondary facial feature data from the face image by searching feature points in the secondary sub-regions.

In this system, the primary facial features can include the eyes and the mouth and the secondary facial features can include the eyebrows and the nose.

In addition, the pre-processing unit generates the face region by a second-chance region growing method.

In addition, the front-end feature extraction unit comprises a partitioning unit for partitioning the face image into a right-eye image portion, a left-eye image portion and a mouth image portion according to the face region generated by the pre-processing unit; a first extractor, coupled to the partitioning unit, for determining a first estimated area pertaining to the left eye of the primary facial features by a feature-point-searching rule; a second extractor, coupled to the partitioning unit, for determining a second estimated area pertaining to the right eye of the primary facial features by the feature-point-searching rule; a third extractor, coupled to the partitioning unit, for determining a third estimated area pertaining to the mouth of the primary facial features by the feature-point-searching rule; and a post-processing unit, coupled to the first extractor, the second extractor and the third extractor, for generating the primary facial feature data pertaining to the eyes and the mouth by modifying the first estimated area, the second estimated area and the third estimated area.

In addition, the back-end feature extraction unit can comprise a partitioning unit for partitioning the face image into two eyebrow image portions and a nose image portion according to the position information of the primary facial feature data generated by the front-end feature extraction unit; an extractor, coupled to the partitioning unit, for determining three estimated area pertaining to the secondary facial features by a feature-point-searching rule; a post-processing unit, coupled to the extractor, for generating the secondary facial feature data pertaining to the nose and the eyebrows by modifying the three estimated areas.

In addition, the feature-point-searching rule can be performed by regarding a point with a largest matching value that is calculated by using a feature template as the feature point, or by using a genetic algorithm.

The present invention also provides a method for automatically extracting facial features from a face image, comprising the steps of: determining a face region according to the face image; partitioning a plurality of primary sub-regions pertaining to the primary facial features from the face region; extracting primary facial feature data from the face image by searching feature points in image portions of the face image corresponding to the primary sub-regions; determining a plurality of secondary sub-regions pertaining to secondary facial features according to the position information of the primary facial feature data; and extracting secondary facial feature data from the face image by searching feature points in the secondary sub-regions.

Further features and advantages of the present invention, as well as the structure and operation of various lo embodiments of the present invention, are described in detail below with respect to the accompanying drawings.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

Figure 1:
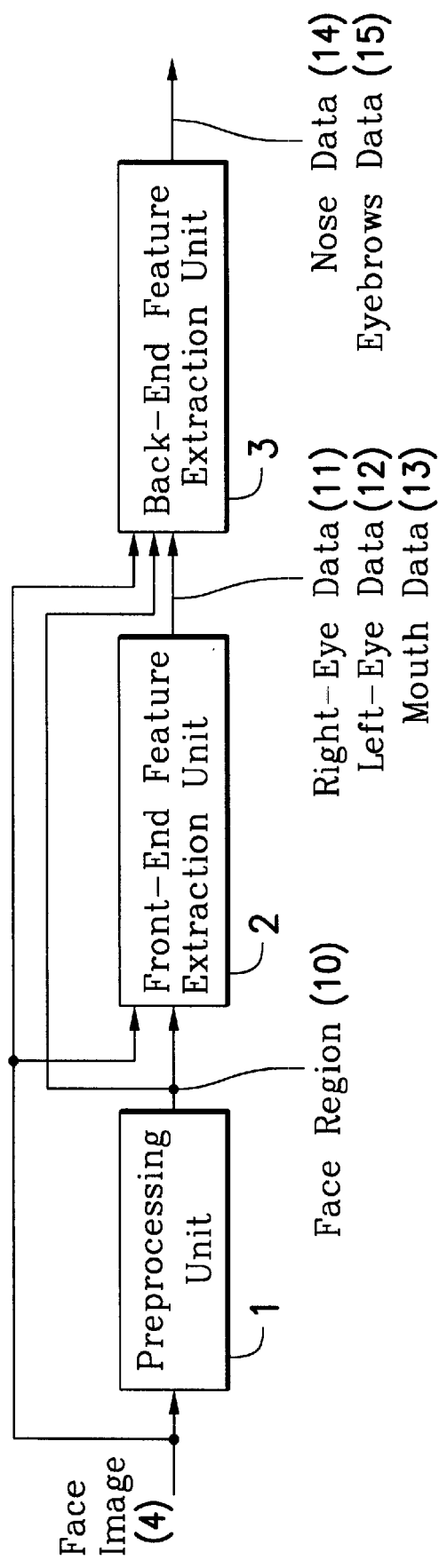
FIG. 1 is a block diagram of the automatic facial feature extraction system in the embodiment of the present invention.

FIG. 1 is a block diagram of the automatic facial feature extraction system in the embodiment. As shown in FIG. 1, the system comprises three main units: a pre-processing unit 1, a front-end feature extraction unit 2 and a back-end feature extraction unit 3. Pre-processing unit 1 is used to estimate a face region 10 from an input face image 4, for example, a head-and-shoulder image, by using a second-chance region growing method. Then the feature points can be searched according to the matching values of the pixels in face region 10. Front-end feature extraction unit 2 is used to find the primary facial features, including right-eye data 11, left-eye data 12 and mouth data 13, in the face region 10. When these primary facial features are found, back-end feature extraction unit 3 can decide other feature points, such as nose data 14 and eyebrows data 15, according to the known facial primary features. In the front-end feature extraction unit 2 and the back-end feature extraction unit 3, the data pertaining to these facial features are acquired by a genetic algorithm. These units in the automatic facial feature extraction system are described in detail, respectively.

Pre-processing Unit 1

As described above, the function of pre-processing unit 1 is to identify the face region 10. In this embodiment the second-chance region growing method, which only needs a few computation operations compared to other schemes, is employed. Since the face region is usually located in the central portion of the face image, the central point of the face image, denoted by $S_0$, can be defined as an initial point. A region denoted by $R_0$ can be grown from the initial point $S_0$. The size of $R_0$ must be checked to confirm whether or not the region is reasonable. In this embodiment, the size of $R_0$ must satisfy the following condition:

$$T_\lambda \leq |R_0| \leq T_h \qquad (1)$$

wherein $T_{80}$ and $T_h$ are predefined constants representing the lower bound and the upper bound of $R_0$.

If $|R_0|$ is beyond the range of $\{T_\lambda, T_h\}$, either a new initial point should be selected or the thresholds should be adjusted, to generate a new region $R_1$. Just the same as the initial case, this new region must be checked by equation (1). This process will be iterated until a region $R_i$ satisfying equation (1) is found. Then the region $R_i$ is the first part of the face region 10.

Figure 2:
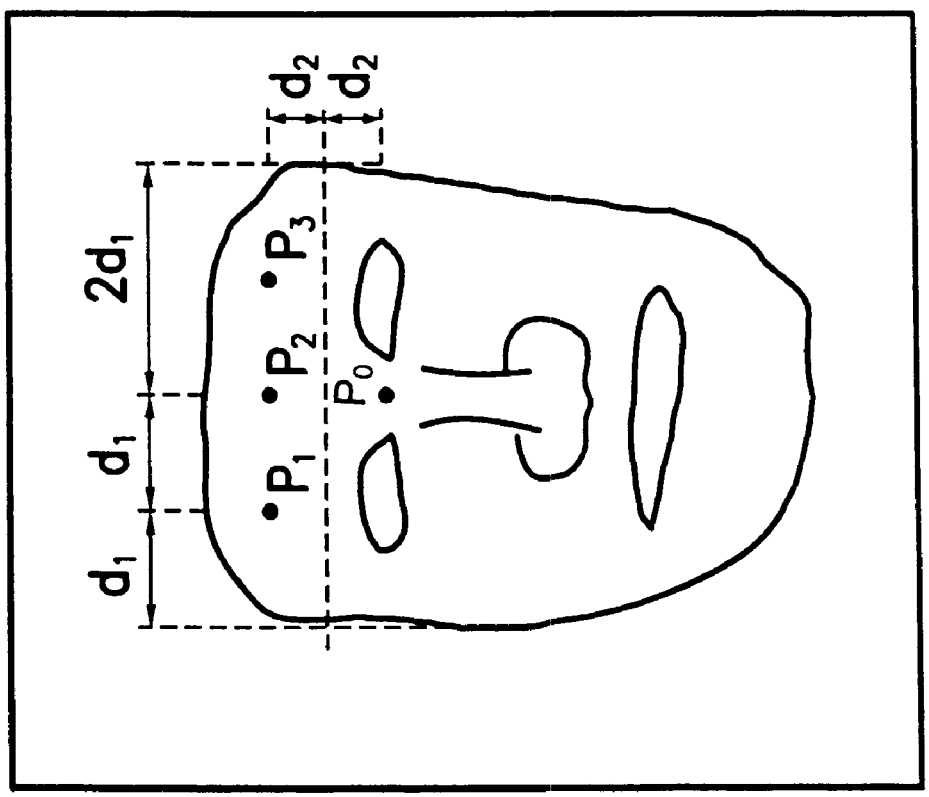
FIG. 2 is a face skeleton diagram illustrating the forehead region processed by the pre-processing unit in the embodiment of the present invention.

It is difficult to detect the forehead region of the face region 10 using the above-mentioned method due to hair, eyebrows or glasses that might affect the processing result. Therefore, the next job of the pre-processing unit 1 is to detect the forehead region. FIG. 2 is a face skeleton diagram illustrating the detection of the forehead region in the embodiment. Suppose that the x-coordinate and y-coordinate of the central point of region $R_i$ are denoted by $C_x(R_i)$ and $C_y(R_i)$, respectively, and the height and the width of region $R_i$ are denoted by $H(R_i)$ and $W(R_i)$, respectively. The coordinates of reference points $P_0$, $P_1$, $P_2$ and $P_3$ shown in FIG. 2 can be expressed by:

$$p_0 = (C_x(R_i),\ C_y(R_i) - H(R_i)/2 + d_2) \qquad (2)$$

$$p_1 = (C_x(R_i) - d_1,\ C_y(R_i) - H(R_i)/2 - d_2) \qquad (3)$$

$$p_2 = (C_x(R_i),\ C_y(R_i) - H(R_i)/2 - d_2) \qquad (4)$$

$$p_3 = (C_x(R_i) + d_1,\ C_y(R_i) - H(R_i)/2 - d_2) \qquad (5)$$

If the intensity of any reference point $P_1$, $P_2$, or $P_3$ satisfies the following condition:

$$|I(p_j) - I(p_0)| \leq T_r,\ j = \{1,2,3\}, \qquad (6)$$

then the target reference point can be used as an initial point to generate a corresponding region $R_{pj}$. If the region $R_{pj}$ satisfies (1)$W(R_{pj}) < W(R_i)$ and (2)$H(R_{pj}) < (1/2)H(R_i)$, then the region $R_{pj}$ is also a part of the face region 10. Accordingly, the face region 10, denoted by R, can be determined by $R = R_i \cup R_p$, where $R_p$ represent one of eight subsets of $\{R_{p1}, R_{p2}, R_{p3}\}$. Therefore, the second chance region growing method used in this embodiment can determine a face region including the forehead part.

In addition, the face region 10 obtained by the pre-processing unit 1 usually contains the information of the neck part, which is useless in analyzing facial features. In this embodiment, therefore, the obtained face region 10 can be further modified as a square shape to eliminate the information of the neck part. Finally, the face region 10 is fed to the next processing units.

Front-end Feature Extraction Unit 2

Figure 3:
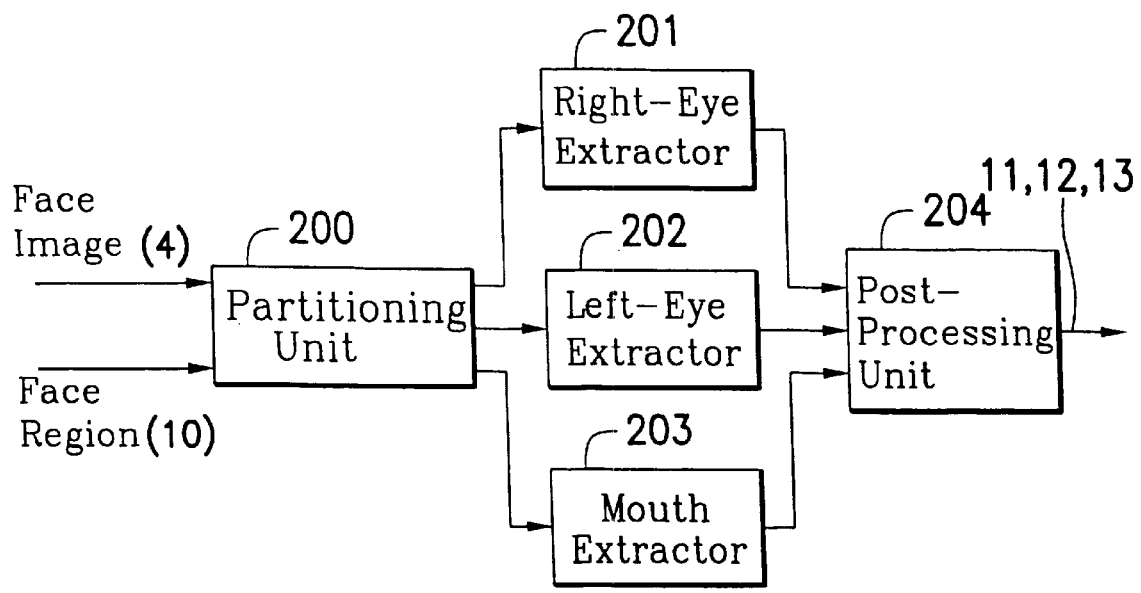
FIG. 3 is a block diagram of the front-end feature extraction unit in the embodiment of the present invention.

The function of the front-end feature extraction unit 2 is to extract the three primary features, including the right eye, the left eye and the mouth, from the face region 10. These primary facial features can be further used to identify other features in the face. For example, the nose is located between both eyes and above the mouth, and the eyebrows are located above both eyes. FIG. 3 is a block diagram of the front-end feature extraction unit 3 in this embodiment. As shown in FIG. 3, the front-end feature extraction unit 3 comprises a partitioning unit 200, a right-eye extractor 201, a left-eye extractor 202, a mouth extractor 203 and a post-processing unit 204. The partitioning unit 200, according to the face region 10 obtained by the pre-processing unit 1, determines three sub-regions pertaining to the right eye, the left eye and the mouth. In addition, it divides the face image 4 into three corresponding portions and sends them to the right-eye extractor 201, the left-eye extractor 202 and the mouth extractor 203 for finding out the zones containing these feature points. The zones that are determined by these extractors are not precise and should be further adjusted by the post-processing unit 204 to generate the right-eye data 11, the left-eye data 12 and the mouth data 13.

Partitioning Unit 200

Figures 4, 5:
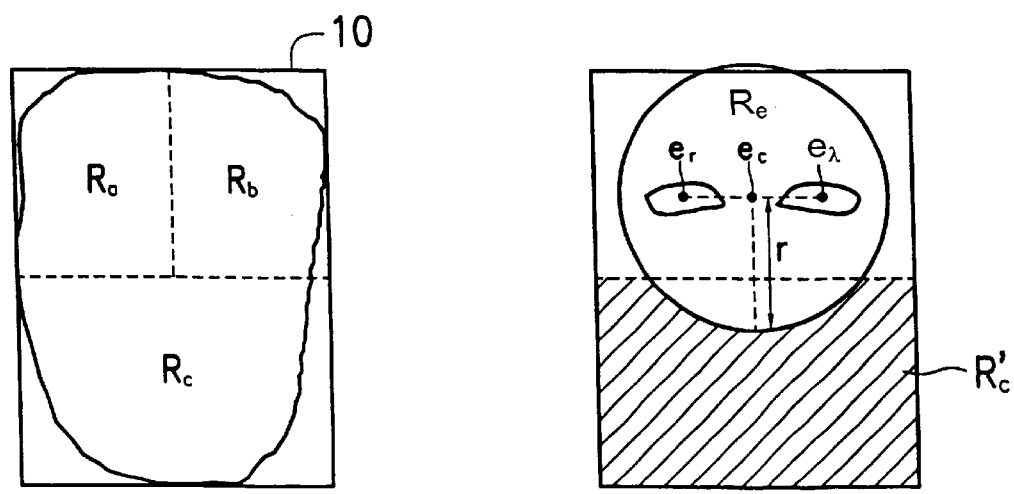
FIG. 4 is a diagram of the sub-regions used to extract the primary facial features in the embodiment of the present invention.
FIG. 5 is a diagram of a modified sub-region used to extract the mouth feature point in the embodiment of the present invention.

The operation of the partitioning unit 200 is described first. The partitioning unit 200 can divide the face region 10 into three regions, represented by $R_a$, $R_b$ and $R_c$, respectively. FIG. 4 is a diagram of the three sub-regions partitioned by the partitioning unit 200 in the embodiment. In general, sub-region $R_a$ contains the right-eye feature point, sub-region $R_b$ contains the left-eye feature point and sub-region $R_c$ contains the mouth feature point.

In the sub-regions $R_a$ and $R_b$, the matching values of the eyebrow feature points, which will be described in detail later, are much lower than those of the eye feature points. Therefore, the left-eye and right-eye feature points can be acquired by finding the pixels with the highest matching values in the sub-region $R_a$ and $R_b$. The possibility of mistaking eyebrows for eyes is quiet low. The sub-region $R_c$, however, should be further modified since the matching values of the nose feature point and the mouth feature point are very close, thereby preventing extraction mistakes. In this embodiment, the sub-region $R_c$ is modified by the scheme shown in FIG. 5, that is, previously deleting a part of the sub-region $R_c$ that contains the nose feature point. Suppose that $e_r$ and $e_\lambda$ represent the right-eye feature point and the left-eye feature point, respectively, and $e_c$ is the central point of two eye feature points. $R_e$ is a round region with the circle center $e_c$ and a radius of r. In this embodiment, r is the distance between $e_r$ and $e_c$. A modified sub-region $R'_c$, which is represented by the dashed region shown in FIG. 5, can be obtained by deleting the round region $R_e$ from the sub-region $R_c$. The modified sub-region $R'_c$ can be used for extracting the mouth feature point.

Extractors 201, 202 and 203

Next, three image portions pertaining to the sub-regions $R_a$, $R_b$ and $R_c$ are sent to the right-eye extractor 201, the left-eye extractor 202 and the mouth extractor 203, respectively. In this embodiment, these extractors have the same function and will be explained together. The function of these extractors is to determine a feature point in the corresponding sub-region with the highest matching value. In this embodiment, the matching value of a point or pixel in a sub-region depends on the brightness level of its surrounding points enclosed by a feature template. The point with the highest matching value within a sub-region can be selected as the feature point of this sub-region.

Figure 6A:
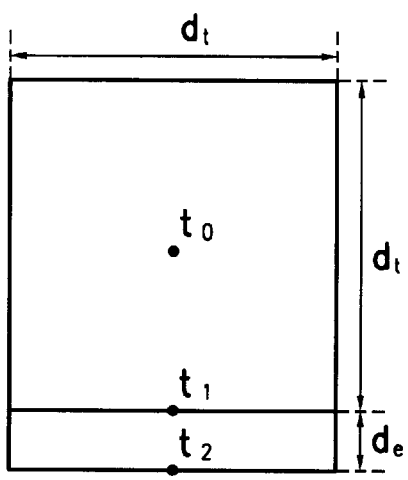
FIG. 6A is a diagram of the feature template in the embodiment of the present invention.

FIG. 6A is a diagram of the feature template used in the embodiment. In FIG. 6A, $t_0$ is the point ready for evaluating its matching value. Point $t_0$ is located in the center of the square that has a width of $d_t$. It is obvious that the area embracing the evaluated point can be a rectangle or other shapes in practical applications. For the sake of clarity, this embodiment adopts a feature template with a square shape. In addition, $d_t$ is set as one-fourth the width of the face region 10. There is an extended region in the lower side, which has a height $d_e$ equal to $(1/8)d_t$ in this embodiment. Two more reference points $t_1$ and $t_2$ are defined in FIG. 6A. If the coordinate of $t_0$ is set as (x,y), the coordinates of $t_1$ and $t_2$ can be expressed as $(x, y+d_t/2)$ and $(x, y+d_t/2+d_e)$, respectively.

The value of the cost function on point $t_0$ can be calculated by the following equation:

$$F(t_0) = C_m(t_0) + U_{I(t_1)-I(t_0)-K} \cdot U_{I(t_2)-I(t_0)-K} \cdot C_c(t_0) \tag{7}$$

wherein $C_m$ is the mean crossing function which is used to accumulate the intensity variation within the desired area, $C_c$ is the central weighting function which is used to compute the intensity difference between the central part and the boundary parts of the desired area, U is a unit step function, I(·) means the intensity of the desired point and K is a constant.

The mean crossing function $C_m$ can be determined by equations (8)~(12):

$$C_m(x, y) = \sum_{i=-d_t/2}^{d_t/2} [V_r(x, y+i) + V_c(x+i, y)] \tag{8}$$

$$V_r(x, y) = \sum_{i=-d_t/2+1}^{d_t/2} U_{-S_r(x+i,y)+S_r(x+i-1,y)-1} \tag{9}$$

$$V_c(x, y) = \sum_{i=-d_t/2+1}^{d_t/2} U_{-S_c(x,y+i)+S_c(x,y+i-1)-1} \tag{10}$$

$$S_r(x+i, y) = \begin{cases} 0 & i = -\dfrac{d_t}{2} \\ 1 & I(x+i, y) - \mu_m > K_m \text{ and } i > -\dfrac{d_t}{2} \\ -1 & I(x+i, y) - \mu_m < -K_m \text{ and } i > -\dfrac{d_t}{2} \\ S_r(x+i-1, y) & |I(x+i, y) - \mu_m| \le K_m \text{ and } i > -\dfrac{d_t}{2} \end{cases} \tag{11}$$

$$S_r(x, y+i) = \begin{cases} 0 & i = -\dfrac{d_t}{2} \\ 1 & I(x, y+i) - \mu_m > K_m \text{ and } i > -\dfrac{d_t}{2} \\ -1 & I(x, y+i) - \mu_m < -K_m \text{ and } i > -\dfrac{d_t}{2} \\ S_c(x, y+i-1) & |I(x, y+i) - \mu_m| \le K_m \text{ and } i > -\dfrac{d_t}{2} \end{cases} \tag{12}$$

wherein the coordinate of $t_0$ is (x,y). The mean crossing function $C_m$ is used to estimate the tendency of the intensity variation using a plurality of row and column bar regions in this square region. The parameter $\mu_m$ in equations (11) and (12) mean the average image intensity of a row or column. $K_m$ is a constant.

Figure 6B:
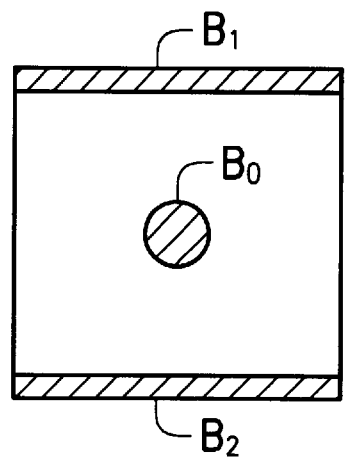
FIG. 6B is a diagram showing the target area used in calculating the central weighting function of the cost function in the embodiment of the present invention.

In this embodiment, the central weighting function $C_c$ is determined by three small regions (one in the center part and two in the boundary part), as shown on FIG. 6B. The function $C_c$ can be determined by equations (13)~(16):

$$C_c(t_0)=[K_c\cdot(\mu_u+\mu_\lambda/2)+\mu_\lambda-\mu_u]/\mu_c \qquad (13)$$

$$C_c(t_0) = \left[K_c \cdot \left(\frac{\mu_u + \mu_\lambda}{2}\right) + \mu_\lambda - \mu_u\right] / \mu_c \qquad (13)$$

$$\mu_c = \frac{1}{|B_0|} \sum_{p \in B_0} I(p) \qquad (14)$$

$$\mu_u = \frac{1}{|B_1|} \sum_{p \in B_1} I(p) \qquad (15)$$

$$\mu_\lambda = \frac{1}{|B_2|} \sum_{p \in B_2} I(p) \qquad (16)$$

wherein $\mu_c$ means the average intensity value of the small region $B_0$ in the center part, and $\mu_u$ and $\mu_\lambda$ mean the average intensity value of the small regions $B_1$ and $B_2$, respectively.

Therefore, according to equation (7), the three extractors 201' 202 and 203 can individually find the corresponding facial feature points.

A conventional method to find the point with the largest matching value within a sub-region is to find and compare the matching values of all points in this sub-region. However, if the number of pixels in the target sub-region is large, this searching process will waste a lot of computational time. In this embodiment, a genetic algorithm is employed to effectively search for possible feature points from a lot of pixels, thereby reducing the computational time. The details of the genetic algorithm are described as follows.

The object of the genetic algorithm is to find a global maximal value in a solution space S. During the process, a population P which consists of N elements is maintained. Each element in the population P is called a chromosome, which is composed of a list of genes. The population P will evolve into another population P' by performing some genetic operations. The chromosomes with higher fitness values will have probability to be kept in the population of the next generation P'. On the other hand, weak chromosomes, whose matching values are small, will be replaced by other strong chromosomes. Therefore, the quality of the chromosomes in the population will be better and better. After a suitable number of generations, the mature population will be expected to contain the element with the global maximum value.

Applying the genetic algorithm to this embodiment, the solution space S is a two-dimensional image sub-region and each image pixel or point in this sub-region is an element in the solution space S. Assume that the central point in the solution space S is located at $(\hat{x},\hat{y})$, the i-th chromosome $C_i$ in the population P can be defined as:

$$C_i = \begin{bmatrix} m_i \\ n_i \end{bmatrix} = \begin{bmatrix} a_{i,k-1} & a_{i,k-2} & \cdots & a_{i,1} & a_{i,0} \\ b_{i,k-1} & b_{i,k-2} & \cdots & b_{i,1} & b_{i,0} \end{bmatrix} \qquad (17)$$

$$i = 0, 1, \ldots, N-1$$

and the relative location is:

$$(m_i,n_i)=(x_i-\hat{x},y_i-\hat{y}) \qquad (18)$$

where $(x_i,y_i)$ represents the coordinate of the central point of the feature template and k represents the codeword size. If the maximal one of the width and the height of the sub-region is w, the value k will be $[\log_2 w]$. The values of the genes are derived from the coordinate of the chromosome, that is $$a_{i,j} = \left\lfloor \frac{m_i + 2w}{2^j} \right\rfloor \bmod 2 \qquad (19)$$

$$b_{i,j} = \left\lfloor \frac{n_i + 2w}{2^j} \right\rfloor \bmod 2 \qquad (20)$$

where the symbol "mod" denotes the modulo operation and $\lfloor . \rfloor$ is a floor function. The relative location $(m_i,n_i)$ can be calculated from the values of the genes by $$m_i = \sum_{j=0}^{k-1} a_{i,j} \cdot 2^j - 2a_{i,k-1}w \qquad (21)$$

$$n_i = \sum_{j=0}^{k-1} b_{i,j} \cdot 2^j - 2b_{i,k-1}w \qquad (22)$$

Figure 7:
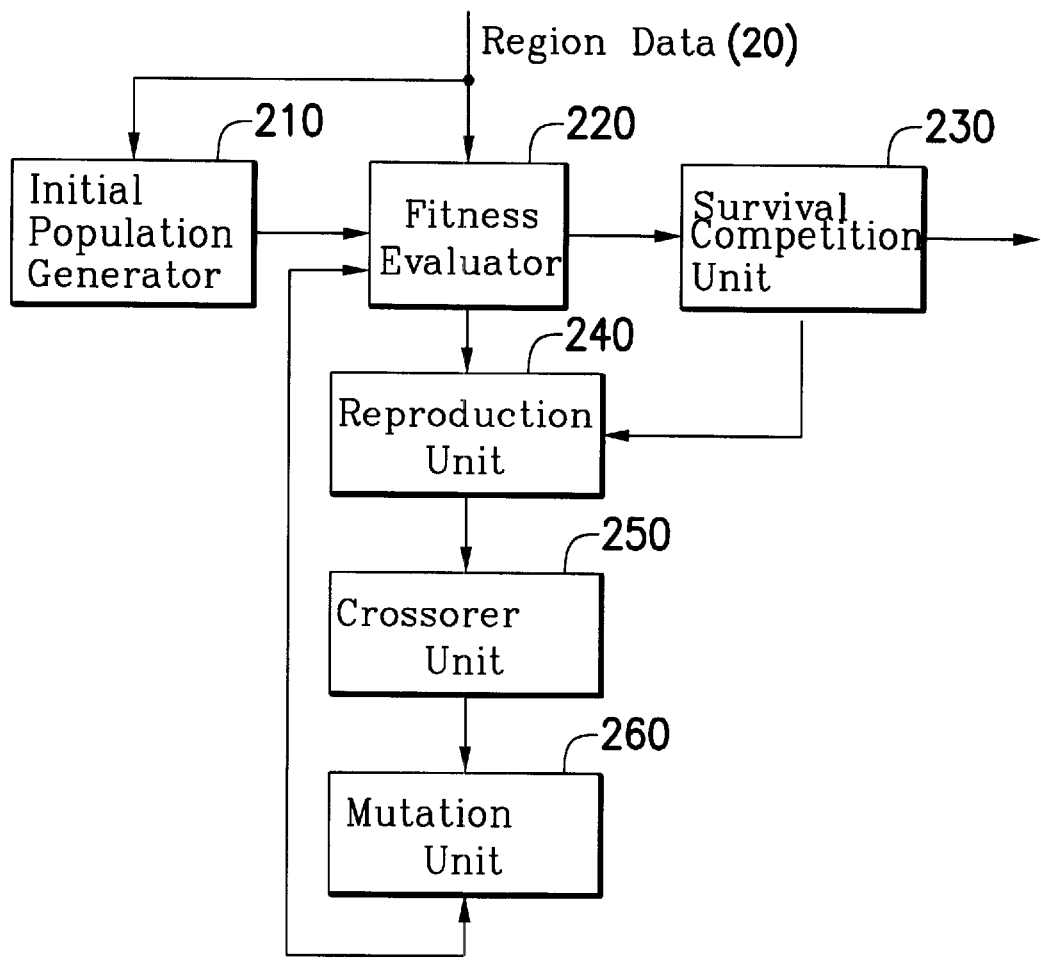
FIG. 7 is a block diagram of the genetic processing unit in the embodiment of the present invention.

FIG. 7 is a block diagram of the genetic processing unit in this embodiment. As shown in FIG. 7, the genetic processing unit comprises an initial population generator 210, a fitness evaluator 220, a survival competition unit 230, a reproduction unit 240, a crossover unit 250 and a mutation unit 260.

The initial population generator 210 is used to generate the initial population in the genetic algorithm. In the common genetic processing system, the initial population is produced by randomly selecting elements from the solution space. In this embodiment, however, the initial population is acquired by a spiral function for reducing the number of iterations. The coordinate $(x_i,y_i)$ of the i-th initial chromosome can be expressed as:

$$x_i=\hat{x}+\Delta\cdot\tilde{x}_i \qquad (23)$$

$$y_i=\hat{y}+\Delta\cdot\tilde{y}_i \qquad (24)$$

where $$\Delta = \left\lceil \frac{d}{4 \max(\tilde{x}_{N-1}, \tilde{y}_{N-1})} \right\rceil \qquad (25)$$

$$\tilde{x}_i = (-1)^\lambda \left([i - \lambda(\lambda+1)] \cdot [1 - (\lfloor 2\sqrt{i} \rfloor \bmod 2)] + \left\lfloor \frac{1}{2}\lambda \right\rfloor\right) \qquad (26)$$

$$\tilde{y}_i = (-1)^\lambda \left([i - \lambda(\lambda+1)] \cdot [\lfloor 2\sqrt{i} \rfloor \bmod 2] - \left\lceil \frac{1}{2}\lambda \right\rceil\right) \qquad (27)$$

$$\lambda = \lfloor \sqrt{i} \rfloor \qquad (28)$$

In addition, the symbol d denotes the length of the sub-region, and $\lceil . \rceil$ and $\lfloor . \rfloor$ denote the ceiling function and the floor function.

The fitness evaluator 220 is used to determine the fitness value associated with each chromosome by equation (29).

$$f_i=U_{F(x_i,y_i)-\hat{F}_\tau} \times (F(x_i,y_i)-\hat{F}_\tau)+\delta_{F(x_i,y_i)-\hat{F}_\tau} \qquad (29)$$

where $F(x_i,y_i)$ is the matching value of the i-th chromosome and $\hat{F}_\tau$ is the $\tau$-th maximal matching value among all of the N matching values. δ is a delta function. The constant τ determines how many chromosomes could be selected at most as the seeds in the reproduction unit 240 for producing a rival population. The chromosomes with larger fitness values in the current population have higher probability to be selected as seeds of the next generation.

The reproduction unit 240 determines an interval $r_i$ for each chromosome by equation (30).

$$r_i = \left[\frac{\sum_{j=0}^{i-1} f_j}{\sum_{j=0}^{N-1} f_j}, \frac{\sum_{j=0}^{i} f_j}{\sum_{j=0}^{N-1} f_j}\right) \quad (30)$$

where $f_j$ is the fitness value of the j-th chromosome in the population, and "[" and ")" denote closing and opening boundaries. The interval $r_i$ can be used to determine whether some chromosome can be selected as a seed, thereby producing the rival population. It is noted that some chromosomes could be selected twice or more. Finally, there are N seeds placed in a mating pool.

The crossover unit 250 employs the uniform crossover method to perform the crossover operation. For every two seeds, denoted by $[m_i,n_i]^t$ and $[m_j,n_j]^t$, selected from the mating pool can produce two new chromosomes by equations (31)~(34).

$$m'_i = (m_i \cap M_x) \cup (m_j \cap \bar{M}_x) \quad (31)$$

$$m'_j = (m_i \cap \bar{M}_x) \cup (m_j \cap M_x) \quad (32)$$

$$n'_i = (n_i \cap M_y) \cup (n_j \cap \bar{M}_y) \quad (33)$$

$$n'_j = (n_i \cap \bar{M}_y) \cup (n_j \cap M_y) \quad (34)$$

where $[m'_i,n'_i]^t$ and $[m'_j,n'_j]^t$ denote the new chromosomes, and $M_x$ and $M_y$ are two randomly generated bit masks, and $\bar{M}_x$ and $\bar{M}_y$ are the complements of $M_x$ and $M_y$, respectively.

The crossover operation of the crossover unit 250 is used to explore new elements from the searched space. Since the crossover operation may result in a violent evolution and is not proper as the chromosomes have been converged, it is applied when the mutation operation described later is performed on the most significant genes (MSG's) of the chromosomes.

After the crossover operation, each chromosome in the mating pool will be processed and transferred into a candidate chromosome of the new generation by the mutation unit 260. Assume that the current seed to be processed is $[m_i,n_i]^t$, where $m_i=[a_{i,k-1}a_{i,k-2} \ldots a_{i,0}]$ and $n_i=[b_{i,k-1}b_{i,k-2} \ldots b_{i,0}]$. In the j-th generation, there are two genes $a_{i,z}$ and $b_{i,z}$ that will be changed, where z=k-2-(j mod k). There are eight mutation operations, denoted by $\{(\zeta_p,\eta_p)|p=0,1,\ldots,7\}$, which can be applied in our implementation, that is:

$$a'_{i,z} = a_{i,z} + \zeta_p \quad (35)$$

$$b'_{i,z} = b_{i,z} + \zeta_p \quad (36)$$

where p is a random integer number between zero and seven. In this embodiment, p is set to be (i mode 8). The mutation operations $\zeta_p$ and $\eta_p$ are therefore defined as:

$$\zeta_p = (-1)^\lambda \left([p+1-\lambda(\lambda+1)] \cdot [1-(\lfloor 2\sqrt{p+1} \rfloor \bmod 2)] + \left\lfloor \frac{1}{2}\lambda \right\rfloor\right) \quad (37)$$

$$\eta_p = (-1)^\lambda \left([p+1-\lambda(\lambda+1)] \cdot [\lfloor 2\sqrt{p+1} \rfloor \bmod 2] - \left\lfloor \frac{1}{2}\lambda \right\rfloor\right) \quad (38)$$

$$\lambda = \lfloor \sqrt{p+1} \rfloor \quad (39)$$

Using these mutation operations, neighboring points of the seeds are included in the rival population to be evaluated for their fitness values. The chromosomes with larger fitness values will have more copies in the mating pool. Therefore, there are more neighboring points of them included. On the contrary, less neighboring points of the chromosomes with smaller fitness values will be included. In other words, the number of the included neighboring points is dependent on the fitness values.

When the mutation operations are performed on the MSG's, chromosomes that are far from the original ones in the search space are generated. The nearby chromosomes are generated when the mutation operations are performed on the least significant genes (LSG's).

There are N chromosomes in the mating pool after performing the genetic operations. Along with the original chromosomes in the current generation, N chromosomes are selected from these 2N chromosomes according to their fitness values. Each chromosome can only be selected once, at most. The chromosomes with larger fitness values will be picked up as the members of the population in the next generation and go through the next iterations of the genetic evolution. Although the sorting operation is needed in the survival competition unit 230, the overhead is not high because the population size is usually not large.

In the survival competition unit 230, the chromosomes with the maximal fitness values are selected from the current population as the possible solution. The possible solution might be replaced by the other ones from generation to generation. The iteration will be terminated and the current possible solution is regarded as the feature point of this sub-region if the solution is not updated for a predetermined period of iterations.

Post-processing Unit 204

When the feature points have been extracted, the right-eye extractor 201, the left-eye extractor 202 and the mouth extractor 203 generate three original estimated areas, respectively, and send them to the post-processing unit 204. The post-processing unit 204 is used to adjust the size of the rectangular windows that specify the original estimated areas.

First, the post-processing unit 204 generates a threshold image of the face image 4. The threshold image is generated by converting the intensity values of the points within the face region 4 to binary values. The conversion rule used in this embodiment is expressed by equation (40):

$$B(i,j) = \begin{cases} 255, & I(i,j) < T, \\ 0, & I(i,j) \geq T \end{cases} \quad (40)$$

where T is a threshold constant. when the intensity I of a pixel point (i,j) is smaller than T, the corresponding binary value is set to be 255 (black); otherwise, the value is set to be 0 (white).

Next, the intensity accumulation of the four boundaries of the estimated windows are calculated by these equations:

$$G_0 = \sum_{i=x-\frac{W}{2}}^{x+\frac{W}{2}} B\left(i, y - \frac{H}{2}\right) \quad (41)$$

$$G_1 = \sum_{i=x-\frac{W}{2}}^{x+\frac{W}{2}} B\left(i, y + \frac{H}{2}\right) \quad (42)$$

$$G_2 = \sum_{j=y-\frac{H}{2}}^{y+\frac{H}{2}} B\left(x - \frac{W}{2}, j\right) \quad (43)$$

$$G_3 = \sum_{j=y-\frac{H}{2}}^{y+\frac{H}{2}} B\left(x + \frac{W}{2}, j\right) \quad (44)$$

where (x,y) is the coordinate of the central point of the original estimated area, and W and H are its width and height, respectively. When one or more of these values $G_0$, $G_1$, $G_2$ and $G_3$ is zero, the rectangular window is shrunk and these values are re-calculated. The post-processing unit 204 has completed the modification of the feature areas until equation (45) is satisfied.

$$G_0 \cdot G_1 \cdot G_2 \cdot G_3 \neq 0 \quad (45)$$

Accordingly, the front-end feature extraction unit 2 can generate the desired right-eye data 11, the left-eye data 12 and the mouth data 13.

Back-end Feature Extraction Unit 3

Figure 8:
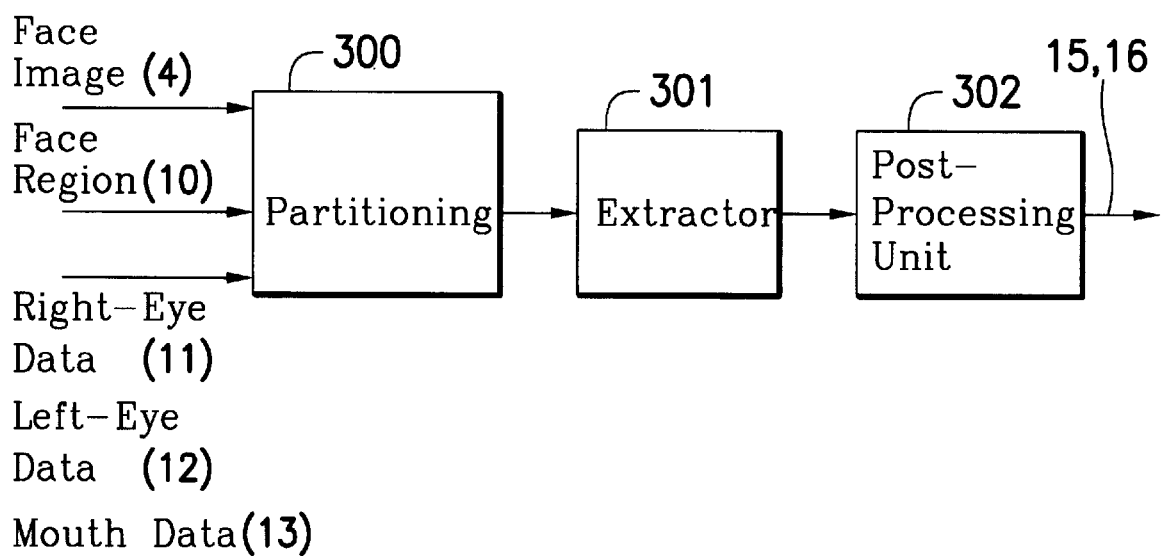
FIG. 8 is a block diagram of the back-end feature extraction unit in the embodiment of the present invention.

The back-end feature extraction unit 3 can further identify other facial feature areas, such as the nose and the eyebrows, by using the right-eye data 11, the left-eye data 12 and the mouth data 13 provided by the front-end feature extraction unit 2. FIG. 8 is a block diagram of the back-end feature extraction unit 3 in the embodiment. As shown in FIG. 8, the back-end feature extraction unit 3 comprises a partitioning unit 300, extractors for the nose and the eyebrows 301 and a post-processing unit 302.

Figure 9:
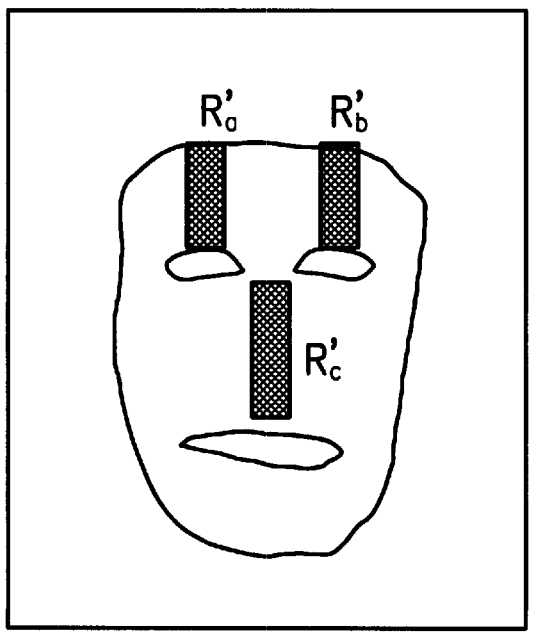
FIG. 9 is a diagram of the sub-regions used to extract the secondary facial features in the embodiment of the present invention.

The partitioning unit 300, according to the right-eye data 11, the left-eye data 12 and the mouth data 13 acquired by the front-end feature extraction unit 2, further partitions three sub-regions for determining the feature areas of the nose and the eyebrows. FIG. 9 is a diagram of the sub-regions used to extract the secondary facial features, the nose and the eyebrows. The sub-regions $R_a'$ and $R_b'$ are located over both eyes, for extracting the feature points and the data pertaining to the eyebrows. The sub-region $R_c'$ is located over the mouth and between the both eyes, for extracting the feature point and the data pertaining to the nose.

The extractor for the nose and the eyebrows 301 is used to process the sub-regions $R_a'$, $R_b'$ and $R_c'$. The operation of this extractor 301 is almost the same as that of the extractors embedded in the front-end feature extraction unit 2, except for the definition of the cost function:

$$F'(t_0) = C_m(t_0) + C_c(t_0) \quad (46)$$

The function F' defined in equation (46) and the function F defined in equation (7) are different in that the function F' is lacking in the factor of the unit step function. Therefore, the calculation of the matching values only depends on the square part of the feature template shown in FIG. 6. In addition, the feature points can be obtained by using the maximal matching value or the genetic algorithm, which will not be described again.

The estimated areas for the nose and the eyebrows are sent to the post-processing unit 302 for adjustment. The post-processing unit 302 also employs equations (40)~(45) to process the estimated areas and to generate the nose data 15 and the eyebrows data 16. It is noted that the post-processing unit 204 in the front-end feature extraction unit 2 and the post-processing unit 302 can be combined together. For example, the front-end feature extraction unit 2 only acquires the estimated areas for the eyes and the mouth. All estimated areas, including the areas pertaining to the primary facial features and the secondary facial features, are modified together in the post-processing unit 302.

The proposed facial feature extraction system has been implemented on a SUN Sparc-10 workstation under Unix environment for verification. The employed reference values are set as:

$T_\lambda = 0.024 \times |R|$ $T_h = 0.39 \times |R|$ $T_v = 35$ $K = 50$ $K_m = 10$ $K_c = 10$ $T = 110$ The facial feature extraction system of this invention is applied to two known GIF image sequences, the Miss America sequence and the Claire sequence, in which some image pictures involve closed eyes, such as the 98th frame in the Miss America sequence and the 8th frame and the 83th frame in the Claire sequence. All facial features in these image pictures can be properly extracted by the system of the invention.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An automatic facial feature extraction system for analyzing a face image, comprising:

a pre-processing unit for generating a face region according to the face image by a second-chance region growing method;

a front-end feature extraction unit, coupled to the pre-processing unit, for dividing the face region into a plurality of primary sub-regions pertaining to primary facial features and extracting primary facial feature data from the face image by searching feature points in image portions of the face image corresponding to the primary sub-regions; and a back-end feature extraction unit, coupled to the front-end feature extraction unit, for determining a plurality of secondary sub-regions pertaining to secondary facial features according to the position information of the primary facial feature data and extracting secondary facial feature data from the face image by searching feature points in the secondary sub-regions.

wherein each estimated area corresponding to the facial feature data of the face image are processed with a post-processing method by a post-processing unit, and the post-processing method comprises the steps of:

generating a threshold image of the estimated area by converting intensity values of points within the estimated area to binary values;

calculating intensity accumulations of boundaries of the threshold image corresponding to the estimated area;

shrinking the estimated area if one of the intensity accumulations equals to zero; and generating the facial feature data corresponding to the estimated area if none of the intensity accumulations equal to zero.

2. The system as recited in claim 1, wherein the primary facial features include the eyes and the mouth.

3. The system as recited in claim 1, wherein the secondary facial features include the nose and the eyebrows.

4. An automatic facial feature extraction system for analyzing a face image, comprising:

a pre-processing unit for generating a face region according to the face image;

a front-end feature extraction unit, coupled to the pre-processing unit, for dividing the face region into a plurality of primary sub-regions pertaining to primary facial features and extracting primary facial feature data from the face image by searching feature points in image portions of the face image corresponding to the primary sub-regions; and a back-end feature extraction unit, coupled to the front-end feature extraction unit, for determining a plurality of secondary sub-regions pertaining to secondary facial features according to the position information of the primary facial feature data and extracting secondary facial feature data from the face image by searching feature points in the secondary sub-regions;

wherein the primary facial features include the eyes and the mouth; and wherein the front-end feature extraction unit comprises a partitioning unit for partitioning the face image into a right-eye image portion, a left-eye image portion and a mouth image portion according to the face region generated by the pre-processing unit, a first extractor, coupled to the partitioning unit, for determining a first estimated area pertaining to the left eye of the primary facial features by a feature-point-searching rule, a second extractor, coupled to the partitioning unit, for determining a second estimated area pertaining to the right eye of the primary facial features by the feature-point-searching rule, a third extractor, coupled to the partitioning unit, for determining a third estimated area pertaining to the mouth of the primary facial features by the feature-point-searching rule, and a post-processing unit, coupled to the first extractor, the second extractor, and the third extractor, for generating the primary facial feature data pertaining to the eyes and the mouth by applying a post-processing method, and the post-processing method comprises the steps of:

generating a threshold image of each estimated area by converting intensity values of points within the estimated area to binary values;

calculating intensity accumulations of boundaries of the threshold image corresponding to the estimated area;

shrinking the estimated area if one of the intensity accumulations equals to zero; and generating the primary facial feature data corresponding to the estimated area if none of the intensity accumulations equal to zero.

5. The system as recited in claim 4, wherein the feature-point-searching rule is performed by regarding a point with a largest matching value that is calculated by using a feature template as the feature point.

6. The system as recited in claim 4, wherein the feature-point-searching rule is performed by a genetic algorithm.

7. The system as recited in claim 4, wherein the feature-point-searching rule is executed by a genetic processing unit performing a genetic algorithm, and the genetic processing unit comprises an initial population generator to generate an initial population in the genetic algorithm, wherein the initial population is acquired by a spiral function, a fitness evaluator to determine a fitness value associated with each chromosome in the initial population, a reproduction unit to determine an interval for each chromosome according to its corresponding fitness value and select the chromosome into a mating pool according to its corresponding interval, a mutation unit to perform mutation operations to mutate the chromosomes in the mating pool into candidate chromosomes of the new generation, and a survival competition unit to determine the estimated areas pertaining to the primary facial features by selecting part of the chromosomes and the candidate chromosomes of the new generation according to its fitness value.

8. An automatic facial feature extraction system for analyzing a face image, comprising:

a pre-processing unit for generating a face region according to the face image;

a front-end feature extraction unit, coupled to the pre-processing unit, for dividing the face region into a plurality of primary sub-regions pertaining to primary facial features and extracting primary facial feature data from the face image by searching feature points in image portions of the face image corresponding to the primary sub-regions; and a back-end feature extraction unit, coupled to the front-end feature extraction unit, for determining a plurality of secondary sub-regions pertaining to secondary facial features according to the position information of the primary facial feature data and extracting secondary facial feature data from the face image by searching feature points in the secondary sub-regions, the secondary facial features including the nose and the eyebrows;

wherein the back-end feature extraction unit comprises a partitioning unit for partitioning the face image into two eyebrow image portions and a nose image portion according to the position information of the primary facial feature data generated by the front-end feature extraction unit, an extractor, coupled to the partitioning unit, for determining three estimated areas pertaining to the secondary facial features by a feature-point-searching rule, and a post-processing unit, coupled to the extractor, for generating the secondary facial feature data pertaining to the nose and the eyebrows by applying a post-processing method, and the post-processing method comprises the steps of:

generating a threshold image of each estimated area by converting intensity values of points within the estimated area to binary values;

calculating intensity accumulations of boundaries of the threshold image corresponding to the estimated area;

shrinking the estimated area if one of the intensity accumulations equals to zero; and generating the primary facial feature data corresponding to the estimated area if none of the intensity accumulations equal to zero.

9. The system as recited in claim 8, wherein the feature-point-searching rule is performed by regarding a point with a largest matching value that is calculated by using a feature template as the feature point.

10. The system as recited in claim 8, wherein the feature-point-searching rule is performed by a genetic algorithm.

11. The system as recited in claim 8, wherein the feature-point-searching rule is executed by a genetic processing unit performing a genetic algorithm, and the genetic processing unit comprises an initial population generator to generate an initial population in the genetic algorithm, wherein the initial population is acquired by a spiral function, a fitness evaluator to determine a fitness value associated with each chromosome in the initial population, a reproduction unit to determine an interval for each chromosome according to its corresponding fitness value and select the chromosome into a mating pool according to its corresponding interval, a mutation unit to perform mutation operations to mutate the chromosomes in the mating pool into candidate chromosomes of the new generation, and a survival competition unit to determine the estimated areas pertaining to the primary facial features by selecting part of the chromosomes and the candidate chromosomes of the new generation according to its fitness value.

12. A method for automatically extracting facial features from a face image, comprising the steps of:

determining a face region according to the face image by a second-chance region growing method;

partitioning a plurality of primary sub-regions pertaining to the primary facial features from the face region;

extracting primary facial feature data from the face image by searching feature points in image portions of the face image corresponding to the primary sub-regions;

determining a plurality of secondary sub-regions pertaining to secondary facial features according to the position information of the primary facial feature data; and extracting secondary facial feature data from the face image by searching feature points in the secondary sub-regions;

wherein each estimated area corresponding to the facial feature data of the face image area processed with a post-processing method, and the post-processing method comprises the steps of:

generating a threshold image of the estimated area by converting intensity values of points within the estimated area to binary values;

calculating intensity accumulations of boundaries of the threshold image corresponding to the estimated area;

shrinking the estimated area if one of the intensity accumulations equals to zero; and generating the primary facial feature data corresponding to the estimated area if none of the intensity accumulations equal to zero.

13. The method as recited in claim 12, wherein the primary facial features include the eyes and the mouth.

14. The method as recited in claim 12, wherein the secondary facial features include the eyebrows and the nose.

15. The method as recited in claim 12, wherein the process of searching feature points is performed by regarding a point with a largest matching value that is calculated by using a feature template as the feature point.

16. The method as recited in claim 12, wherein the process of searching feature points is performed by a genetic algorithm.

17. The method as recited in claim 12, wherein the process of searching feature points is executed by a genetic processing unit performing a genetic algorithm, and the genetic processing unit comprises an initial population generator to generate an initial population in the genetic algorithm, wherein the initial population is acquired by a spiral function, a fitness evaluator to determine a fitness value associated with each chromosome in the initial population, a reproduction unit to determine an interval for each chromosome according to its corresponding fitness value and select the chromosome into a mating pool according to its corresponding interval, a mutation unit to perform mutation operations to mutate the chromosomes in the mating pool into candidate chromosomes of the new generation, and a survival competition unit to determine the estimated areas pertaining to the primary facial features by selecting part of the chromosomes and the candidate chromosomes of the new generation according to its fitness value.

* * * * *